INVENTOR.
BURNS N. GAFFORD.

March 2, 1965 B. N. GAFFORD 3,172,012
PROTECTIVE RELAY FOR POLYPHASE MACHINES RESPONSIVE
SOLELY TO POSITIVE AND NEGATIVE SEQUENCE CURRENTS
Filed Feb. 4, 1960 4 Sheets-Sheet 2

*INVENTOR.*
BURNS N. GAFFORD.

March 2, 1965 B. N. GAFFORD 3,172,012
PROTECTIVE RELAY FOR POLYPHASE MACHINES RESPONSIVE
SOLELY TO POSITIVE AND NEGATIVE SEQUENCE CURRENTS
Filed Feb. 4, 1960 4 Sheets-Sheet 3

INVENTOR.
BURNS N. GAFFORD.
BY

INVENTOR.
BURNS N. GAFFORD.

United States Patent Office 3,172,012
Patented Mar. 2, 1965

3,172,012
PROTECTIVE RELAY FOR POLYPHASE MACHINES RESPONSIVE SOLELY TO POSITIVE AND NEGATIVE SEQUENCE CURRENTS
Burns N. Gafford, Lakeshore Drive, Austin, Tex.
Filed Feb. 4, 1960, Ser. No. 6,817
5 Claims. (Cl. 317—47)

The invention relates to improved protective relays for polyphase machines in which factors tending to cause overheating are synthesized or combined from the positive- and negative-sequence currents to provide a torque output usable to protect the polyphase machines. In one of its aspects, it relates to such a relay in which adjustments can be made so that the heating and temperature characteristics of each particular polyphase machine to which the relay is applied can be synthesized.

The present state of the commercially practiced art has been aptly described in National Electrical Manufacturers Association Standard MGI–6.07 as follows:

"The currents at normal operating speed with unbalanced voltages will be greatly unbalanced in the order of approximately 6 to 10 times the voltage unbalance. This introduces a complex problem in selecting the proper overload protective devices, particularly since devices selected for one set of unbalanced conditions may be inadequate for a different set of unbalanced voltages. Increasing the size of the overload protective device is not a solution inasmuch as protection against heating from overload and from single-phase operation is lost."

Conventional commercially available relays fail to correlate the various factors tending to cause overheating. In an effort to obtain better protection, additional relays, each of which operates on a single quantity, have been suggested. With any number and types of conventional relays in a system, there are found to be conditions under which the machine will be tripped off unnecessarily because of lack of correlation between the various sensing devices.

Further conditions to be considered are:

(1) No single line current or single symmetrical component current is indicative of motor temperature and heating.

(2) The power dissipated in the machine stator is unevenly distributed among the phases and causes unbalanced temperatures and resistances. More extreme unbalances of hot-spot temperatures result.

(3) Eddy-current machines such as the deep-bar or double-cage types dissipate more power per ampere of negative-sequence current than for an equal positive-sequence current.

(4) The ratio of rotor current to stator current is greater for negative-sequence current than for positive.

(5) Conditions 3 and 4 dictate that negative-sequence currents should be weighted more heavily than positive-sequence currents in determining copper loss. According to condition 2, total copper loss does not indicate the maximum temperature rise so that unbalance factor or negative-sequence current should be weighted even more than specified by conditions 3 and 4.

A judicious measure of temperature rise is required. The combination of current-squared, $I_1^2 + KI_2^2$ where $K$ is greater than 1.0 indicates maximum temperature rise conditions. $I_1$ is taken as positive-sequence current of a positive-sequence system, the latter being defined as a balanced system which rotates in the same direction as the fundamental system, and $I_2$ is the negative-sequence current of a negative-sequence system which is a balanced system which rotates oppositely to the fundamental system. Further, $K$ is a multiplier of the negative-sequence current squared to produce a synthesis which is an approximation of the allowable temperature rise for all conditions of unbalance including spatial unbalance of heat dissipation with consequent unbalance of phase temperatures.

A thermal synthesis relay or system has been suggested which recognizes that negative-sequence currents have a greater heating effect per ampere than do positive-sequence currents and cause spatial unbalance of heat dissipation with consequent unbalance of phase temperatures. This type of relay has several disadvantages. It is relatively difficult to construct. Each relay has been sized for the particular motor with which it is to operate and such sizing has been accomplished only at the factory. Accordingly if an error has been made in supplying the proper relay or if it is desired to use the relay with a motor of different characteristics or rating, it is necessary to send the relay to the factory for modification. Further, the thermal is influenced by ambient temperature and, where the motor and relay are located in different ambients, this becomes an objectionable characteristic.

One object of the invention is to provide a system which synthesizes the principal factors tending to cause heating in a machine to provide a torque output which is a reliable measure of the temperature of the machine.

Another object is to provide a protective relay which not only will provide more adequate protection than will the plurality of relays mentioned in the NEMA quotation above but is also susceptible of relatively easy field adjustment permitting it to be used with any one of different motors having different heating characteristics.

Another object is to provide a relay which reflects the heating effect of positive- and negative-sequence currents as torques with the torques being summed in such a manner that the torque due to negative-sequence currents has a greater effect on the output of the relay than does the torque due to positive-sequence currents so as to properly reflect the greater heating effect of the negative-sequence currents.

Another object is to provide an improved protective relay which permits maximum safe utilization of the polyphase motor under all combinations of shaft load and unbalanced voltages or currents.

Another object is to provide an improved protective relay which responds to positive- and negative-sequence currents or voltages in unlike proportions, the device being more responsive to negative-sequence currents or voltages than to positive-sequence currents or voltages by the factor $K$ defined above, the relay being designed so that $K$ can be easily changed.

Another object is to provide an improved relay which automatically applies a derating factor to a motor when operating on unbalanced voltages or currents.

Other objects, advantages and features will be apparent from this disclosure to those skilled in the art.

For a more detailed understanding of the invention and for illustration of a preferred embodiment thereof, reference is made to the accompanying drawings in which.

Figure 1:
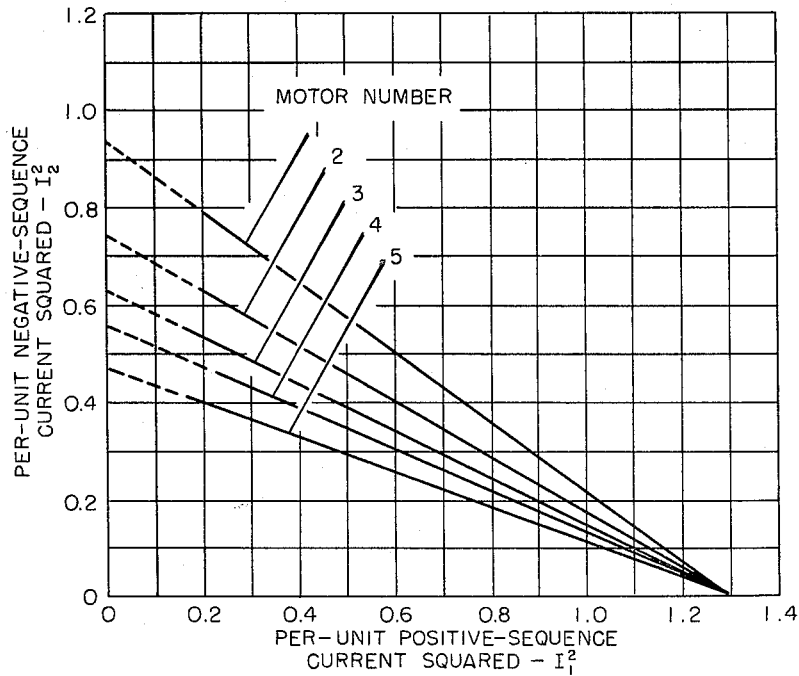
FIG. 1 shows a graph of the constant loss curves as functions of positive-sequence current squared and negative-sequence current squared for several typical motors.

Referring now to FIG. 1 there is illustrated the relation of positive-sequence current squared, $I_1^2$, and negative-sequence current squared, $I_2^2$, for typical motors all of which have the same horsepower rating but having different numbers of poles. In plotting these curves, the copper losses were maintained and considered constant. By projecting the constant loss lines to $I_1^2=0$, values of $I_2^2$ are obtained which will give the same losses as the respective values of $I_1^2$ when $I_2^2=0$. Hence the constant in the equation $$h = I_1^2 + kI_2^2 \tag{1}$$

may be evaluated as the tangent of the angle between the constant loss line and the vertical axis or $k=I_1^2/I_2^2$ at the intercepts with the zero axis, where $k$ is a multiplier for $I_2^2$ to produce the same average heat in the motor as $I_1^2$. As above defined $I_1$ is the positive-sequence current and $I_2$ is the negative-sequence current.

Because of the uneven spatial distribution of copper loss and temperatures, the total loss and the average temperature must be limited to less than the normal values in order to contain the hot-spot temperature within recommended limits. This is accomplished in the protective system of the invention by using a negative-sequence multiplier, K, which is greater than dictated by average copper loss. Therefore, the hot-spot temperature as seen by the relay is $$H = H_1 + H_2 = I_1^2 + KI_2^2 \tag{2}$$

where $H_1$ measures the motor losses due to positive-sequence current which is determined by shaft load and magnitude of positive-sequence voltage, and $H_2$ measures the motor losses due to negative-sequence current with allowance being made for unbalanced spatial distribution of temperature.

Figure 2:
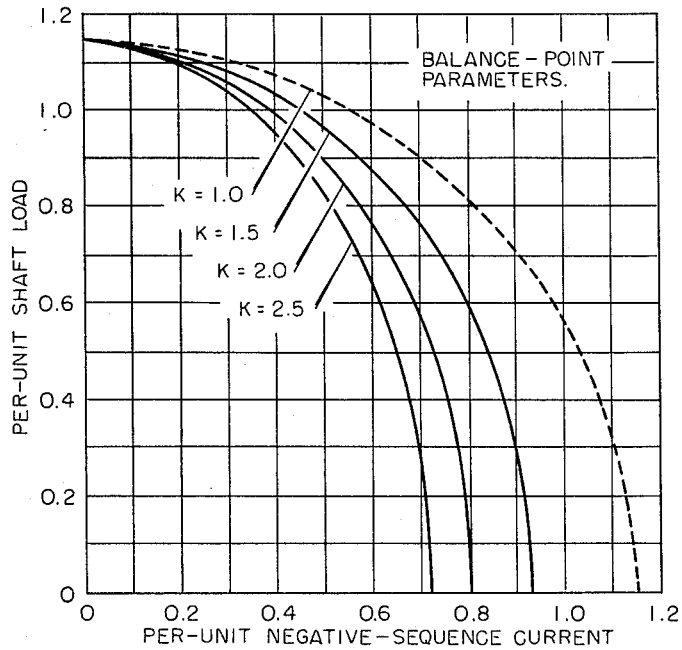
FIG. 2 shows a graph of the balance-point parameters of per unit allowable shaft load versus per unit negative-sequence current for various values of $K$.

FIG. 2 shows the heating equation of the relay for several values of K. Assuming that the motor has a ratio of positive- to negative-sequence impedance of $Z_1/Z_2=6$ and that $E_2=0.1$, then $I_2=0.6$. From the data given by the curve of FIG. 2, the derating factors can be calculated. Using the above assumed figures and based on service-factor capacity of 1.15, these derating factors are respectively, 0.765, 0.665 and 0.556 at $K=1.5$, 2.0 and 2.5. Obviously, the dashed line curve of $K=1$ would not be applicable to any motor.

The desired value of K of FIG. 2 may be set to match the heating characteristic of the particular machine to be protected. Thus, correlation is obtained between positive- and negative-sequence currents as reflected by overload, short circuit, locked rotor, low voltage, unbalanced voltages, open phase and phase reversal.

By this derivation it is possible to make use of positive- and negative-sequence currents in a manner to obtain an actuating quantity H, Equation 2, equal to $I_1^2 + KI_2^2$.

Now referring to FIGS. 3 to 8, there is shown a relay that embodies a current filter comprising a positive-sequence driving magnet 1 having an impedance $Z_1$, a negative-sequence driving magnet 2 having an impedance $Z_2$, a resistor 3 having a resistance R, and a reactor 4 having an impedance $Z_3$. The relationship between these filter elements is $$Z_1 = Z_2 = Z \text{ and } (Z_3 + Z) = (R+Z) \angle 60° \tag{3}$$

These filter elements are connected at junctions $a, b, c, d$ to form an impedance network or bridge. The points $a, c$ are connected to the current transformer 5 associated with phase C and the other points are connected to the other current transformer 6 associated with phase B. These current transformers serve to reduce large currents to convenient values for the relay and to insulate the relay from the high voltage of the polyphase circuit A, B, C energizing the polyphase motor.

The currents in the driving magnets 1, 2 act additively upon an induction cup, cylinder or disc 7 which is rotatably mounted on frame 8. The disc is restrained negatively or oppositely by the force of the spiral spring 9. The currents provide forces on the disc which vary as the squares of the currents applied to the driving magnets.

Under conditions of current balance in the polyphase circuit A, B, C, the currents traversing the several phases A, B, C are normally 120° apart. The current from current transformer 6 that is connected in phase B is delivered to the impedance network at junctions $b, d$ while the current from the current transformer 5 that is connected to phase C is delivered to the impedance network at junctions $a, c$. No current transformer is connected in line with phase A for the reason that any disturbance between phase A and either of the other phases B, C will be reflected by the unbalance in the affected phases. Other arrangements of current transformers can be used provided the same relative phase relations with respect to the relay are maintained.

With the filter constructed as above described, the sum of the current components of phases B and C which flow through the coil of magnet 1 is always proportional to the positive-sequence components while the sum of the current components which flow through the coil of magnet 2 is always proportional to the negative-sequence components of the polyphase system. For further description of the filter, reference is made to U.S. Patent No. 1,726,928 to Sleeper et al.

It has been found that positive- and negative-sequence currents of a certain magnitude do not characterize the heating or temperature conditions of polyphase machines such as induction motors. For such machines, the relation $I^2 = I_1^2 + KI_2^2$ provides a heating equation of the machine where K has a value substantially greater than 1 and preferably equal to or greater than 1.5 and for most motors in the range of 1.5 to 3.0 depending upon the motor.

In accordance with this invention, the factor K is built into the relay, preferably in such a manner as to be adjustable. With magnets 1 and 2 constructed to exert equal turning forces on disc 7 and $I_1$ equals $I_2$, the K multiplier for $I_2$ can be realized by positioning magnet 2 a greater distance from the center of the disc than is magnet 1. To facilitate adjusting to a suitable K, means are provided mounting at least one and preferably both magnets so that their poles can be moved toward and away from the disc center. One such mounting means is illustrated as including pivot pins 10 which pivotally mount the magnets to frame 8. A suitable latch for holding the magnets in their selected positions is illustrated as including a sector 11 carried by each magnet to slide between clamp 12 and bracket extension 13. This clamp can be loosened, the magnet swung to a desired position and the clamp retightened whereby the relative torque exerted by the magnets on the disc can be adjusted over a range.

In order to reduce the size of the relay and yet maintain sensitivity of adjustment, it is preferred that shaded-pole type of magnets be used. By making the shading of magnet 2 of greater effectiveness than that of magnet 1, at least a portion of K can be built into the magnets themselves and then the magnets moved back and forth as above described to vary the K values about that which is built into the magnets. Thus, in FIG. 4, the negative-sequence driving magnet 2 is provided with shading coils 14 of maximum effectiveness; in FIG. 5, the positive-sequence driving magnet 1 is provided with a less effective shading coil 15 to provide a force of $1/K$ of the force of the negative-sequence driving magnet 2. The value of K built into the relay preferably is an intermediate value in the range between 1.5 and 3.0 although the value will be dependent upon the motor being protected.

Figure 3:
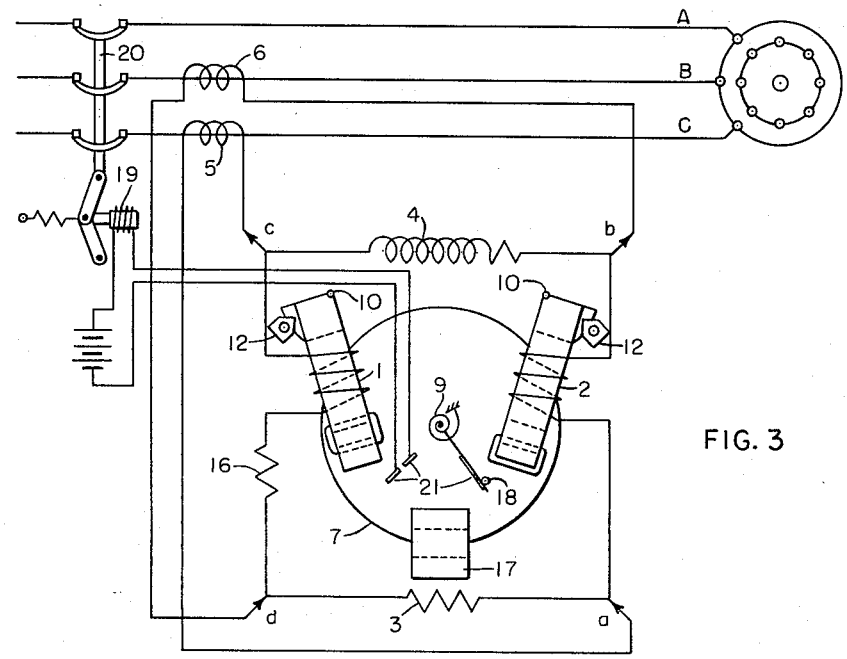
FIG. 3 is a diagrammatic view of a relay constructed in accordance with a preferred embodiment of the present invention.
Figure 4:
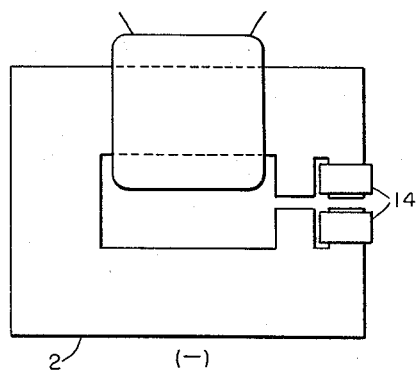
FIG. 4 is an elevational view of a negative-sequence shaded-pole driving magnet of the relay of FIG. 3.
Figure 5:
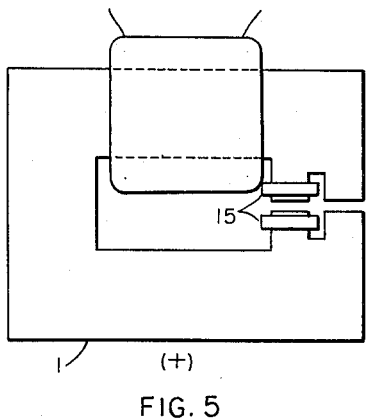
FIG. 5 is an elevational view of a positive-sequence shaded-pole driving magnet of the relay of FIG. 3.
Figure 6:
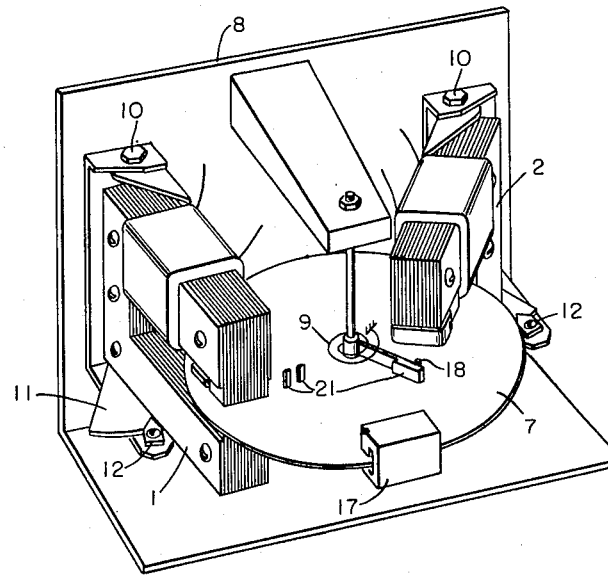
FIG. 6 is a perspective view of a portion of the relay of FIG. 3.
Figure 7:
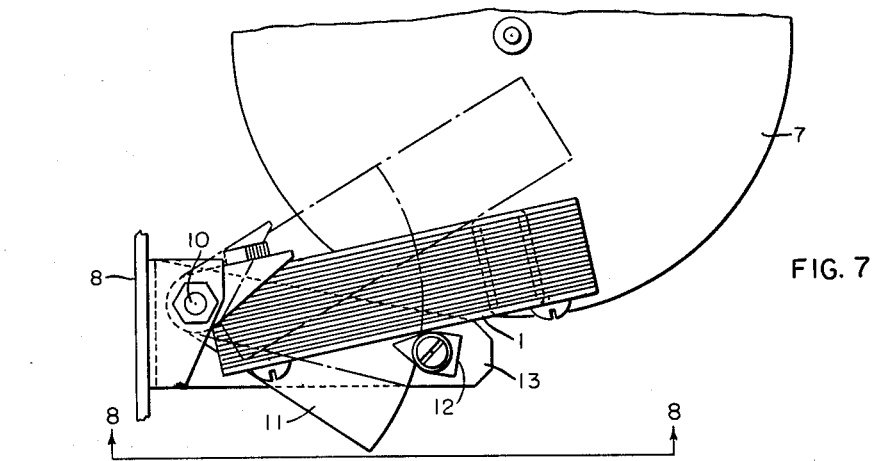
FIG. 7 is a plan view further illustrating the mounting of the driving magnets of FIG. 6.
Figure 8:
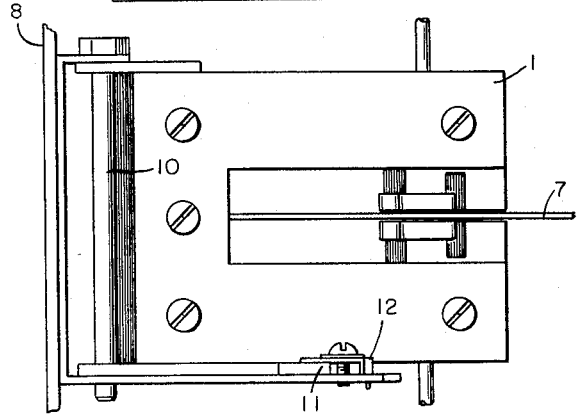
FIG. 8 is a side elevational view taken on the line 8—8 of FIG. 7.

If the shading coils are merely made unequal in effectiveness as set forth above, the impedance paths in the impedance network or bridge will likewise become unequal so that the terms of Equation 3 above would no longer be met. The impedance network must be made equal or balanced in order to operate accurately. The reactive impedances are made equal by providing a correction in the number of turns. The resistive impedances are made equal by the addition of a small resistance value 16 external to a coil as shown in FIG. 3.

To supplement the adjustment of K by moving the magnets, further adjustments of operating characteristics, such as minimum tripping values and tripping times, can be made by adjusting spiral spring 9, damping magnet 17, time lever 18, and the ratio of current transformers 5 and 6.

Means are provided for protecting the polyphase machine upon predetermined torque being applied to the rotatable torque responsive member 7. Such means can include a trip coil 19 adapted to open switch 20 in the power line upon closure of contacts 21 responsive to rotation of the disc 7. Thus, the torque producing means 1, 2 coact with rotatable member 7 to apply a torque to the latter which is proportional to $I_1^2+KI_2^2$ to actuate trip coil 19 upon $I_1^2+KI_2^2$ exceeding a predetermined value.

Figure 9:
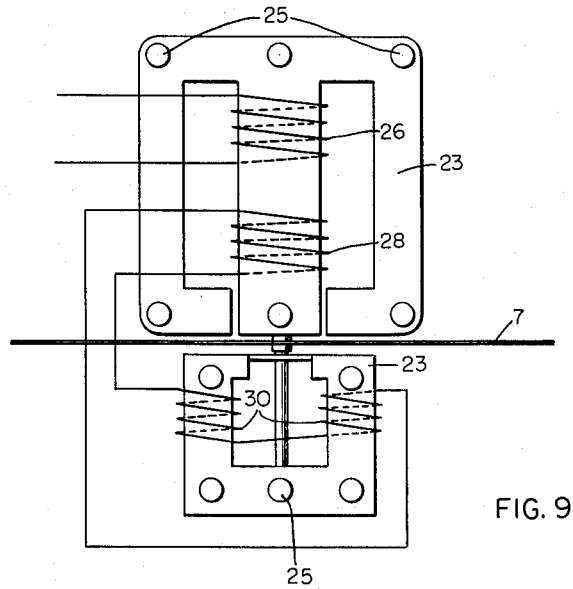
FIG. 9 is an elevational view of another type of driving magnet and adjustable mounting.
Figure 10:
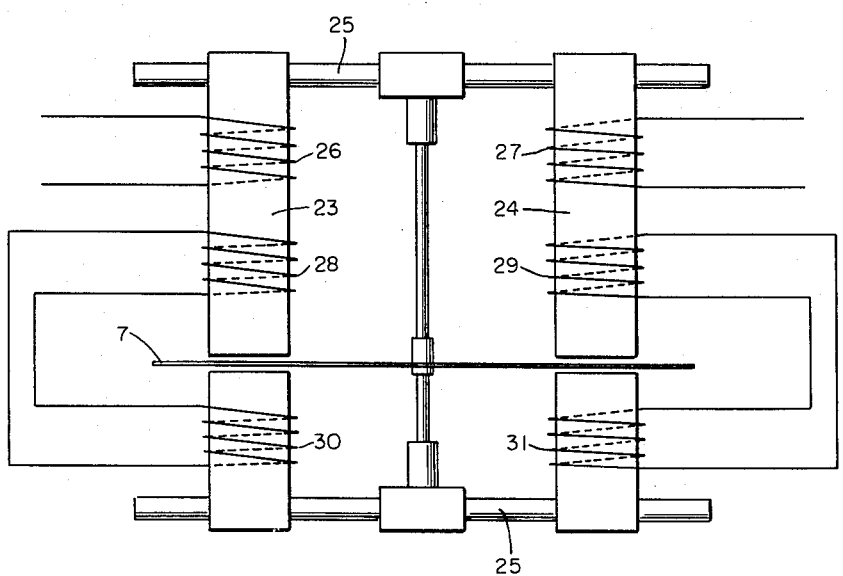
FIG. 10 is a side elevational view of the driving magnets and adjustable mounting shown in FIG. 9.

FIGS. 9 and 10 illustrate wattmetric type of core-coil arrangements used for the driving magnets. The cores 23, 24 are each slidable on parallel rods 25 to adjust the relative torque applied to disc 7 and thereby establish the multiplier K. Coils 26 and 27 are connected into the filter in place of the driving magnets 1, 2, by connecting them respectively between points c, d, and b, a. Each of these coils functions as the primary of a transformer of which coils 28 and 29 are the secondaries which, in turn, energize coils 30 and 31. The forces of the two magnets are adjusted to provide the intermediate values of K, ranging generally between 1.5 and 3, by means of phase relations and turns in the coils 28, 29, 30 and 31. The resistive and reactive impedances of coils 26, 28 and 27, 29 are then adjusted as described for the shaded-pole driving magnets 1, 2, so that their impedances comply with Equation 3. Further adjustment of K is obtained by adjustment of the cores 23, 24 inward or outward from the center of the disc by sliding them on rods 25.

The apparatus of FIGS. 9 and 10 can be supplied with the other appurtenant equipment of FIGS. 3-8 such as spring 9, contacts 21, time lever 18, trip coil 19, damping magnet 17, etc.

Setting of the relay can be accomplished by circulating rated current multiplied by the service factor in terms of secondary values through the coil of positive-sequence driving magnet 1 (or coil 26) while other parts and components of the filter or bridge are disconnected, and adjusting the magnet 1 (or 23), or restraining spiral spring 7, or both, so that contacts 21 are just ready to close. The negative-sequence driving magnet is similarly set for proper adjustment of K by circulating through the coils of magnet 2 (or coil 27) a current of rated value multiplied by the service factor divided by the square root of K, and then positioning the magnet 2 (or 24) so that the contacts 21 are just ready to close.

In this manner the contacts have been properly adjusted and positioned for the particular K value desired to fit the heating characteristics of the motor, and the relay is capable of synthesizing the heating characteristic and to similate the heat and temperature rise of the motor. When a predetermined value of heat or temperature is computed or synthesized by the relay, the disc 7 has rotated sufficiently to close contacts 21 and energize a trip coil 19 of a circuit breaker 20.

Thus it is apparent that the use of the factor K causes the relay to respond more to negative-sequence currents than to positive-sequence currents by an amount which is sufficient to reflect the actual heating characteristics of both the positive- and negative-sequence currents and that this prevents overheating of the machine, without tripping the machine merely because of unbalance of phase and currents not otherwise indicative of overheating and excessive temperature rise of the machine.

The relay is not responsive to any particular fault of current or voltage or phase unbalance conditions unless such condition or conditions are also causative of overheating and excessive temperature rises beyond a predetermined value in a polyphase machine or circuit. Thus, one of the advantages of the present invention is the absence of indiscriminate switching of the circuit breaker when overheating and temperature rises are not present in the machine.

It is contemplated that the invention can take forms other than those shown in the drawings. By way of example, K can be adjusted or determined by using different materials on the rotative element under each magnet, or the use of two discs of different materials, or by changing the air gap, etc.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter set forth or shown in the accompanying drawings is to be interpreted as illustrative and not in a limiting sense.

The invention having been described, what is claimed is:

1. A protective system for polyphase machines having a heating characteristic such that the heating effect of negative-sequence currents $I_2$ is greater than that of positive-sequence currents $I_1$ comprising a torque responsive means, a torque producing means coacting with the torque responsive means to apply a torque thereto solely proportional to $I_1^2$, a torque producing means coacting with the torque responsive means to apply a torque thereto solely proportional to $KI_2^2$ where K has a value substantially greater than 1, whereby the torque responsive means has a torque applied thereto proportional to $I_1^2+KI_2^2$, the aforesaid torque producing means being the only means applying torque to the torque responsive means responsive to an electrical condition in the machine being protected, and means responsive to predetermined actuation of the torque responsive means by the torque producing means indicative of a predetermined temperature rise to provide protection of the polyphase machine from overheating.

2. The system of claim 1 wherein the torque responsive means is a rotatable member and the torque producing means are electromagnets, and means mounting at least one of the electromagnets for movement relative to the rotatable member whereby the value of K can be readily changed.

3. A protective system for polyphase machines having a heating characteristic such that the heating effect of negative-sequence currents $I_2$ is greater than that of positive-sequence currents $I_1$ comprising a rotatable member, positive- and negative-sequence driving means associated with the rotatable member to apply torque thereto respectively proportional solely to $I_1^2$ and $KI_2^2$ where K is from 1.5 to 3, the aforesaid driving means being the only means applying torque to the rotatable member responsive to an electrical condition in the machine being protected, a resistance connected from one terminal of the positive-sequence driving means to a terminal of the negative-sequence driving means, a reactance connected from the other terminal of the positive-sequence driving means to the other terminal of the negative-sequence driving means, the impedance of the positive- and negative-sequence driving means being equal to each other, said connections performing a 60° phase shift in one sequence driving means and the resistance with respect to the other sequence driving means and the reactance, and a relay operably connected to said rotatable member to be actuated when the torque applied to the rotatable member and proportional to $I_1^2 + KI_2^2$ exceeds a predetermined value.

4. The system of claim 3 wherein the driving means are electromagnets with shading coils, the shading coil for the negative-sequence electromagnet being of sufficiently greater effectiveness than that of the positive-sequence electromagnet that the value of K falls within said range of 1.5 to 3.

5. The system of claim 4 wherein means are provided mounting at least one of the electromagnets for movement relative to the rotatable member so as to change the moment arm of the torque force applied and thereby adjust K.

References Cited in the file of this patent
UNITED STATES PATENTS

| | | |
|---|---|---|
| 1,726,928 | Sleeper | Sept. 3, 1929 |
| 1,816,772 | Grassot | July 28, 1931 |
| 1,816,778 | Iliovici | July 28, 1931 |
| 1,939,044 | Evans | Dec. 12, 1933 |
| 2,231,717 | Harder | Feb. 11, 1941 |
| 2,836,767 | Glassburn | May 27, 1958 |

FOREIGN PATENTS

| | | |
|---|---|---|
| 34,381 | Netherlands | Aug. 15, 1934 |